(12) United States Patent
Kamitani et al.

(10) Patent No.: US 11,549,794 B2
(45) Date of Patent: Jan. 10, 2023

(54) CONTROL METHOD OF SHAPE MEASURING APPARATUS

(71) Applicant: MITUTOYO CORPORATION, Kanagawa (JP)

(72) Inventors: Hiroshi Kamitani, Tochigi prefecture (JP); Shota Sakakibara, Tochigi prefecture (JP); Yo Terashita, Tochigi prefecture (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/391,428

(22) Filed: Aug. 2, 2021

(65) Prior Publication Data

US 2022/0042780 A1 Feb. 10, 2022

(30) Foreign Application Priority Data

Aug. 6, 2020 (JP) .............................. JP2020-133616

(51) Int. Cl.
*G01B 5/012* (2006.01)
*G01B 21/04* (2006.01)

(52) U.S. Cl.
CPC ........... *G01B 5/012* (2013.01); *G01B 21/042* (2013.01)

(58) Field of Classification Search
CPC ............................... G01B 5/012; G01B 21/042
USPC .......................................... 33/340, 502, 503
See application file for complete search history.

(56) References Cited

U.S. PATENT DOCUMENTS

| | | | | |
|---|---|---|---|---|
| 7,296,363 | B2 * | 11/2007 | Danisch ................. | G01P 15/18 33/503 |
| 11,274,945 | B2 * | 3/2022 | Terashita ............... | G01B 5/008 |
| 11,289,303 | B2 * | 3/2022 | Chen .................. | G01B 11/2755 |
| 2017/0363403 | A1 * | 12/2017 | Jonas ..................... | G01B 5/012 |
| 2022/0074732 | A1 * | 3/2022 | Shepherd ............. | G01B 11/005 |

FOREIGN PATENT DOCUMENTS

| | | |
|---|---|---|
| JP | 7-104146 | 11/1995 |
| JP | 5332009 | 11/2013 |
| JP | 6153816 | 6/2017 |

* cited by examiner

*Primary Examiner* — George B Bennett
(74) *Attorney, Agent, or Firm* — Greenblum & Bernstein, P.L.C.

(57) ABSTRACT

A main reference point PM is provided to a base portion of a shape measuring apparatus including a rotary table. An origin-point relative-value registration includes measuring a main reference point with a probe to acquire a coordinate value of the main reference point and registering as a calibration-reference-point coordinate value Pp, registering a rotation center point of the rotary table as a calibration-rotation-center coordinate value Rp, and calculating a relative coordinate value of the calibration-rotation-center coordinate value Rp with respect to the calibration-reference-point coordinate value Pp and registering as a rotary-table origin-point relative coordinate value $\Delta D1$. A rotary-table origin-point re-registration step includes the steps of measuring the main reference point with the probe to acquire a coordinate value the main reference point and registering as a current-reference-point coordinate value Pc, and adding the rotary-table origin-point relative coordinate value $\Delta D1$ to the current-reference-point coordinate value Pc to calculate a rotary-table origin-point current coordinate value Rc.

5 Claims, 10 Drawing Sheets

CONTROL METHOD OF SHAPE MEASURING APPARATUS

INCORPORATION BY REFERENCE

This application is based upon and claims the benefit of priority from JP patent application No. 2020-133616, filed on Aug. 6, 2020 (DAS code AF7C), the disclosure of which are incorporated herein in its entirety by reference.

BACKGROUND OF THE INVENTION

1. Field of the Invention

The present invention relates to a control method of a shape measuring apparatus and, in particular, relates to a setting registration method of a rotary-table coordinate system.

2. Description of Related Art

There is a known coordinate measuring system including a rotary table mechanism (see, for example, JP H7-104146 A, JP 5332009 B, and JP 6153816 B).

To measure the shape of a workpiece using a coordinate measuring system including a rotary table mechanism, it is necessary to register a rotary-table coordinate system as a preparation for the measurement.

When a coordinate measuring machine is turned on and off, the origin point of the encoder of the coordinate measuring machine is reset, and which can cause a change in the origin point of the coordinate measuring machine each time when the coordinate measuring machine is turned on and off. In order for this change amount not to be a measurement value error of the rotary table mechanism, it is necessary to set a rotary-table coordinate system each time of measurement. A method for obtaining the rotation center of a rotary table to register a rotary-table coordinate system is disclosed in, for example, JP 5332009 B and JP 6153816 B.

SUMMARY OF THE INVENTION

As a preparation for measurement, it is necessary to obtain the rotation center of a rotary table each time of measurement. For this preparation, it is further necessary to set a master ball or a gauge on the rotary table to measure the locus of the master ball or the gauge while the rotary table is rotated. This work takes considerable time and labor, but to properly set a rotary-table coordinate system is essential to obtain accurate measurement values, and the preparation is unavoidable.

However, a rotary-table coordinate system frequently needs to be registered, and which prevents the improvement of the measurement efficiency. Thus, there has been a demand for a method for efficiently setting and registering a rotary-table coordinate system.

A purpose of the present invention is to provide a control method of a shape measuring apparatus capable of efficiently setting and registering a rotary-table coordinate system.

A control method of a shape measuring apparatus according to an exemplary embodiment of the present invention, the shape measuring apparatus comprising:

a base portion;

a movement mechanism having three translation axes orthogonal to each other;

a probe supported by the movement mechanism and having a detection point at a tip end;

a rotary table mechanism configured to rotationally drive, around a rotation axis, a rotary table on which an object to be measured is placed; and a main reference point PM fixedly installed to the base portion, the shape measuring apparatus being configured to measure a shape of the object to be measured with the probe, the control method comprises a setting registration method of a rotary-table coordinate system having a center point of the rotary table as an origin point OT, wherein the setting registration method comprises:

an origin-point relative-value registration step; and a rotary-table origin-point re-registration step, the origin-point relative-value registration step comprises the steps of:

measuring the main reference point PM with the probe to acquire a coordinate value of the main reference point PM and registering the acquire coordinate value of the main reference point PM as a calibration-reference-point coordinate value Pp (Ppx, Ppy, Ppz);

obtaining a rotation center point of the rotary table and registering the obtained rotation center point as a calibration-rotation-center coordinate value Rp (Rpx, Rpy, Rpz); and calculating a relative coordinate value of the calibration-rotation-center coordinate value Rp (Rpx, Rpy, Rpz) with respect to the calibration-reference-point coordinate value Pp (Ppx, Ppy, Ppz) and registering the calculated relative coordinate value as a rotary-table origin-point relative coordinate value $\Delta D1$, the rotary-table origin-point re-registration step is performed to register re-setting of the rotary-table coordinate system, and the rotary-table origin-point re-registration step comprising the steps of:

measuring the main reference point PM with the probe to acquire a coordinate value of the main reference point PM and registering the acquired coordinate value as a current-reference-point coordinate value Pc (Pcx, Pcy, Pcz); and adding the rotary-table origin-point relative coordinate value $\Delta D1$ to the current-reference-point coordinate value Pc (Pcx, Pcy, Pcz) to calculate a rotary-table origin-point current coordinate value Rc (Rcx, Rcy, Rcz).

A control method of a shape measuring apparatus according to an exemplary embodiment of the present invention, the shape measuring apparatus comprising:

a base portion;

a movement mechanism having three translation axes orthogonal to each other;

a probe supported by the movement mechanism and having a detection point at a tip end;

a rotary table mechanism configured to rotationally drive, around a rotation axis, a rotary table on which an object to be measured is placed;

a main reference point PP fixedly installed to the base portion; and a sub-reference point PS fixedly installed to a point of the rotary table mechanism, the point being non-rotatable, the shape measuring apparatus being configured to measure a shape of the object to be measured with the probe, the control method comprises a setting registration method of a rotary-table coordinate system having a center point of the rotary table as an origin point OT, wherein the setting registration method comprises:
an origin-point relative-value registration step; and
a rotary-table origin-point re-registration step,
the origin-point relative-value registration step comprises the steps of:
measuring the sub-reference point PS with the probe to acquire a coordinate value of the sub-reference point PS and registering the acquired coordinate value of the sub-reference point PS as a calibration-sub-reference-point coordinate value PS (Psx, Psy, Psz);
obtaining a rotation center point of the rotary table and registering the obtained rotation center point as a calibration-rotation-center coordinate value Rp (Rpx, Rpy, Rpz); and
calculating a relative coordinate value between the calibration-sub-reference-point coordinate value PS (Psx, Psy, Psz) and the calibration-rotation-center coordinate value Rp (Rpx, Rpy, Rpz) and registering the calculated relative coordinate value as a rotary-table origin-point relative coordinate value $\Delta D2$,
the rotary-table origin-point re-registration step is performed to register re-setting of the rotary-table coordinate system, and
the rotary-table origin-point re-registration step comprises the steps of:
measuring the main reference point PP with the probe to acquire a coordinate value of the main reference point PP and registering the acquired coordinate value as a current-reference-point coordinate value PPc (PPcx, PPcy, PPcz);
measuring the sub-reference point PS with the probe to acquire a coordinate value of the sub-reference point PS and registering the acquired coordinate value as a current-sub-reference-point coordinate value PSc (PScx, PScy, PScz); and
adding the rotary-table origin-point relative coordinate value $\Delta D2$ to the current-sub-reference-point coordinate value PSc (PScx, PScy, PScz) to calculate a rotary-table origin-point current coordinate value Rc (Rcx, Rcy, Rcz).

In an exemplary embodiment of the present invention, it is preferable that the control method further comprising comparing the calibration-sub-reference-point coordinate value PS (Psx, Psy, Psz) with the current-sub-reference-point coordinate value PSc (PScx, PScy, PScz) to obtain a difference between the calibration-sub-reference-point coordinate value PS (Psx, Psy, Psz) and the current-sub-reference-point coordinate value PSc (PScx, PScy, PScz) and notifying an operator or performing the origin-point relative-value registration step when the difference is equal to or greater than a preset permissible value.

A control program or recording media on which the control program is recorded, according to an exemplary embodiment of the present invention, the control program of a shape measuring apparatus comprising:
a base portion;
a movement mechanism having three translation axes orthogonal to each other;
a probe supported by the movement mechanism and having a detection point at a tip end;
a rotary table mechanism configured to rotationally drive, around a rotation axis, a rotary table on which an object to be measured is placed; and
a main reference point PM fixedly installed to the base portion,
the shape measuring apparatus being configured to measure a shape of the object to be measured with the probe and incorporating a computer,
the control program causes the computer to function as a setting registration means of a rotary-table coordinate system having a center point of the rotary table as an origin point OT, wherein
the control program causes the computer to execute:
an origin-point relative-value registration step; and
a rotary-table origin-point re-registration step,
the origin-point relative-value registration step comprises the steps of:
measuring the main reference point PM with the probe to acquire a coordinate value of the main reference point PM and registering the acquire coordinate value of the main reference point PM as a calibration-reference-point coordinate value Pp (Ppx, Ppy, Ppz);
obtaining a rotation center point of the rotary table and registering the obtained rotation center point as a calibration-rotation-center coordinate value Rp (Rpx, Rpy, Rpz); and
calculating a relative coordinate value of the calibration-rotation-center coordinate value Rp (Rpx, Rpy, Rpz) with respect to the calibration-reference-point coordinate value Pp (Ppx, Ppy, Ppz) and registering the calculated relative coordinate value as a rotary-table origin-point relative coordinate value $\Delta D1$,
the rotary-table origin-point re-registration step is performed to register re-setting of the rotary-table coordinate system, and
the rotary-table origin-point re-registration step comprising the steps of:
measuring the main reference point PM with the probe to acquire a coordinate value of the main reference point PM and registering the acquired coordinate value as a current-reference-point coordinate value Pc (Pcx, Pcy, Pcz); and
adding the rotary-table origin-point relative coordinate value $\Delta D1$ to the current-reference-point coordinate value Pc (Pcx, Pcy, Pcz) to calculate a rotary-table origin-point current coordinate value Rc (Rcx, Rcy, Rcz).

A control program or recording media on which the control program is recorded, according to an exemplary embodiment of the present invention, the control program of a shape measuring apparatus comprising:
a base portion;
a movement mechanism having three translation axes orthogonal to each other;
a probe supported by the movement mechanism and having a detection point at a tip end;
a rotary table mechanism configured to rotationally drive, around a rotation axis, a rotary table on which an object to be measured is placed;
a main reference point PP fixedly installed to the base portion; and
a sub-reference point PS fixedly installed to a point of the rotary table mechanism, the point being non-rotatable,
the shape measuring apparatus being configured to measure a shape of the object to be measured with the probe and incorporating a computer,
the control program causes the computer to function as a setting registration means of a rotary-table coordinate system having a center point of the rotary table as an origin point OT, wherein
the control program causes the computer to execute:
an origin-point relative-value registration step; and a rotary-table origin-point re-registration step,
the origin-point relative-value registration step comprises the steps of:
  measuring the sub-reference point PS with the probe to acquire a coordinate value of the sub-reference point PS and registering the acquired coordinate value of the sub-reference point PS as a calibration-sub-reference-point coordinate value PS (Psx, Psy, Psz);
  obtaining a rotation center point of the rotary table and registering the obtained rotation center point as a calibration-rotation-center coordinate value Rp (Rpx, Rpy, Rpz); and
  calculating a relative coordinate value between the calibration-sub-reference-point coordinate value PS (Psx, Psy, Psz) and the calibration-rotation-center coordinate value Rp (Rpx, Rpy, Rpz) and registering the calculated relative coordinate value as a rotary-table origin-point relative coordinate value $\Delta D2$,
the rotary-table origin-point re-registration step is performed to register re-setting of the rotary-table coordinate system, and
the rotary-table origin-point re-registration step comprises the steps of:
  measuring the main reference point PP with the probe to acquire a coordinate value of the main reference point PP and registering the acquired coordinate value as a current-reference-point coordinate value PPc (PPcx, PPcy, PPcz);
  measuring the sub-reference point PS with the probe to acquire a coordinate value of the sub-reference point PS and registering the acquired coordinate value as a current-sub-reference-point coordinate value PSc (PScx, PScy, PScz); and
  adding the rotary-table origin-point relative coordinate value $\Delta D2$ to the current-sub-reference-point coordinate value PSc (PScx, PScy, PScz) to calculate a rotary-table origin-point current coordinate value Rc (Rcx, Rcy, Rcz).

DETAILED DESCRIPTION

Figure 1:
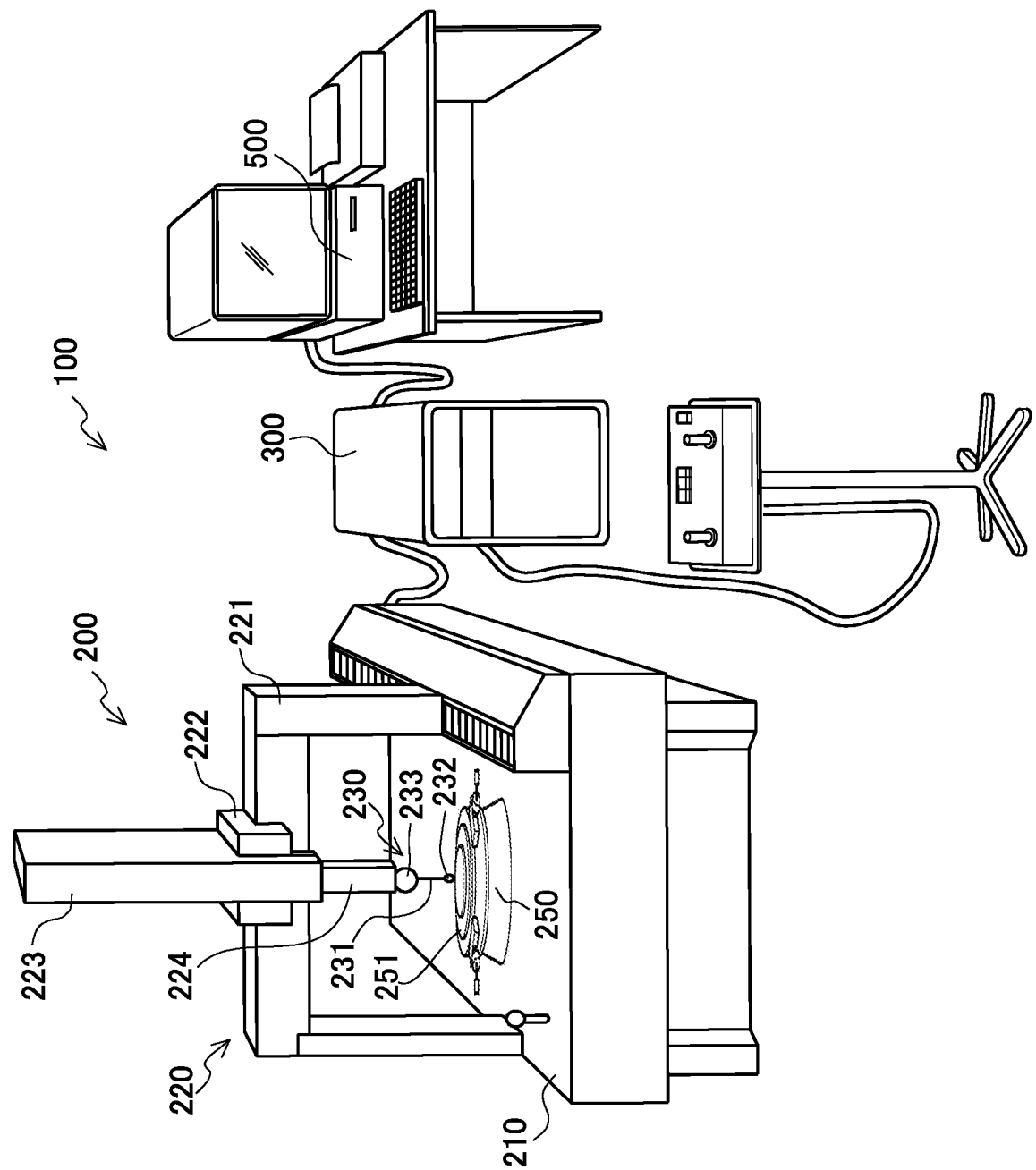
FIG. 1 is a diagram showing a configuration of an entire shape measuring system.
Figure 2:
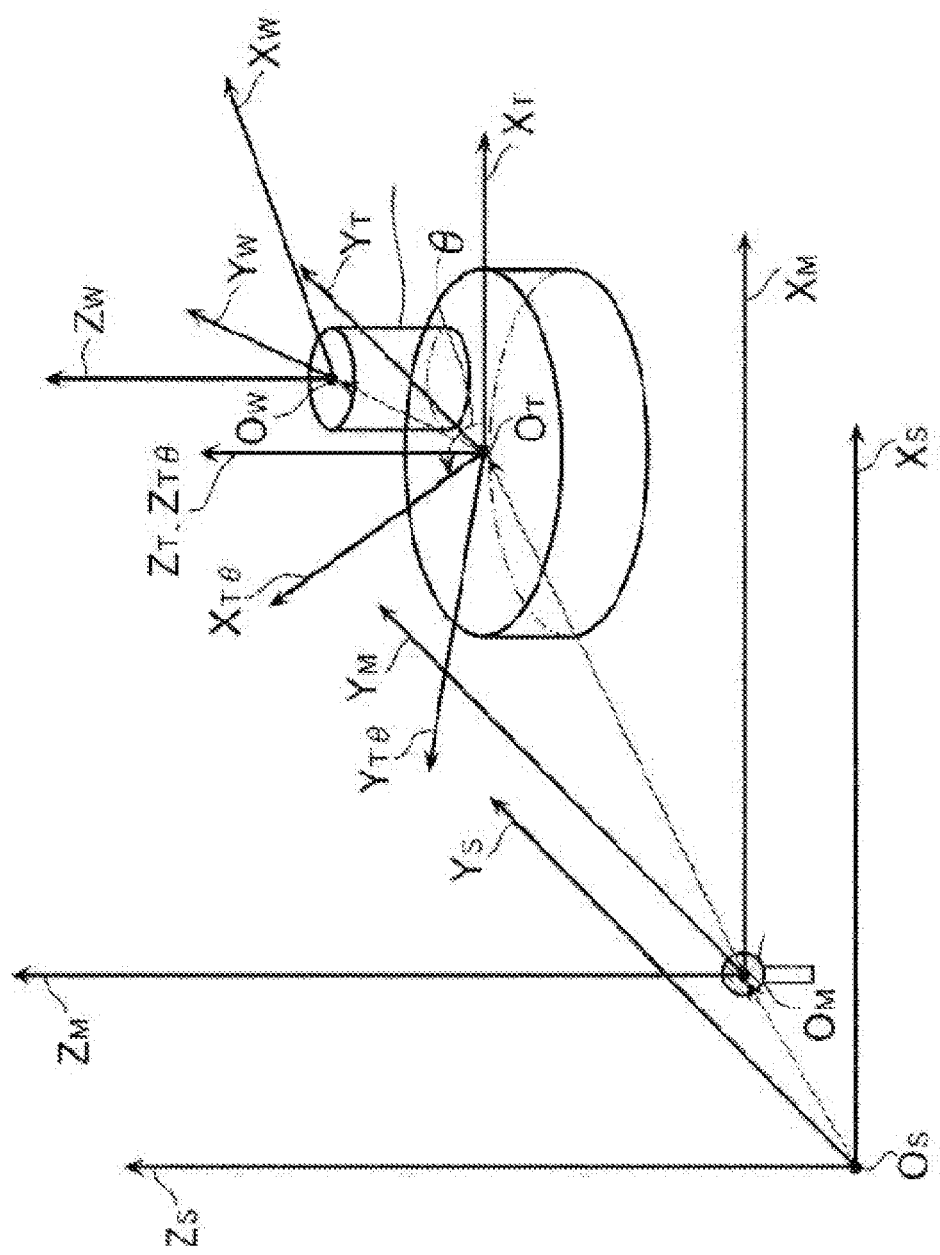
FIG. 2 is a diagram exemplifying relations between coordinate systems.

Exemplary embodiments of the present invention are illustrated and described with reference to reference signs attached to the elements in the drawings.
(First Exemplary Embodiment)
FIG. 1 is a diagram showing a configuration of an entire shape measuring system 100.
The shape measuring system 100 includes a coordinate measuring machine 200, a motion controller 300, and a host computer 500. The motion controller 300 controls the drive of the coordinate measuring machine 200. The host computer 500 controls the motion controller 300 and performs necessary data processing.
The coordinate measuring machine 200 includes a surface plate 210, a movement mechanism 220, a probe 230, and a rotary table mechanism 250.
The movement mechanism 220 includes a gate type Y slider 221, an X slider 222, a Z axis column 223, and a Z spindle 224. The Y slider 221 is provided to be slidable on the surface plate 210 in a Y direction. The X slider 222 slides along a beam of the Y slider 221 in an X direction. The Z axis column 223 is fixed to the X slider 222. The Z spindle 224 moves up and down inside the Z axis column 223 in a Z direction.
The Y slider 221, the X slider 222, and the Z spindle 224 are each attached with a drive motor (not shown) and an encoder (not shown). The drive of each drive motor is controlled by a drive control signal from the motion controller 300. Each encoder detects a moving amount of the Y slider 221, the X slider 222, or the Z spindle 224 and outputs a detection value to the motion controller 300.
Here, a scale coordinate system (Xs, Ys, Zs) is set to the coordinate measuring machine 200.
FIG. 2 is a diagram exemplifying relations between coordinate systems. The scale coordinate system includes an Xs axis, a Ys axis, and a Zs axis that are orthogonal to each other. The Zs axis is an upward vertical direction. An origin point Os of the scale coordinate system is determined by the origin point of the scale of the encoder provided along the Xs axis, the origin point of the scale of the encoder provided along the Ys axis, and the origin point of the scale of the encoder provided along the Zs axis.
The probe 230 is attached to the lower end of the Z spindle 224.
The probe 230 includes a stylus 231 having a contact point (detection point) 232 at a tip end (the -Z axis direction side), and a supporting portion 233 supporting the base end (the +Z axis direction side) of the stylus 231. The contact point 232 has a spherical shape and is brought into contact with an object to be measured. The supporting portion 233 supports the stylus 231 in such a manner that the stylus 231 is movable in each axis direction of the X, Y, and Z axes within a certain range when an external force is applied to the stylus 231, that is, when the contact point 232 is brought into contact with an object to be measured. In addition, the supporting portion 233 includes a probe sensor (not shown) that detects the position of the stylus 231 in each axis direction. The probe sensor outputs a detection value to the motion controller 300.
The rotary table mechanism 250 is installed on the surface plate and rotates a rotary table 251 with an incorporated motor (not shown). Note that, the rotation axis of the rotary table 251 is substantially parallel to the Zs axis. The rotary table mechanism 250 incorporates a rotary encoder (not shown), and the rotary encoder outputs a detection value to the motion controller 300.

Here, a main master ball as a main reference point is installed at a predetermined position above the surface plate 210.

The main master ball is used to set a machine coordinate system (XM, YM, ZM). The main master ball is a steel ball, a ceramic ball, or the like. The diameter (radius) of the main master ball is known. That is, by measuring the coordinates of some points on the surface of the main master ball with the probe, the center position of the main master ball can be uniquely determined. The main master ball is supported at the tip end of a pillar portion having a known height from the top surface of the surface plate in the Z axis direction. The scale coordinate system (Xs, Ys, Zs) is translated in order for the center position of the main master ball to an origin point OM, whereby the machine coordinate system (XM, YM, ZM) is obtained.

Then, a rotary-table coordinate system (XT, YT, ZT) and a rotating-table coordinate system (XTθ, YTθ, ZTθ) are set to the rotary table mechanism 250.

The rotary-table coordinate system (XT, YT, ZT) is a coordinate system having the center of the top surface of the rotary table when the rotating angle of the rotary table is 0° as an origin point OT and the center axis direction of the rotary table as ZT. The rotary-table coordinate system (XT, YT, ZT) is not changed although the rotary table is rotated. It is assumed that XT is parallel to Xs and that YT is parallel to Ys, although this is not essential. (The rotary-table coordinate system (XT, YT, ZT) can be also referred to as a rotary-table fixed coordinate system.)

The rotating-table coordinate system (XTθ, YTθ, ZTθ) is a coordinate system that rotates together with the rotation of the rotary table.

An origin point OTθ of the rotating-table coordinate system coincides with the origin point OT of the rotary-table coordinate system. In addition, ZTθ of the rotating-table coordinate system coincides with ZT of the rotary-table coordinate system. (The rotating-table coordinate system can be also referred to as a rotary-table rotation coordinate system.)

In addition, a workpiece coordinate system (Xw, Yw, Zw) is also used. The workpiece coordinate system (Xw, Yw, Zw) is a coordinate system having a predetermined point (for example, the apex) of a surface of a workpiece as an origin point and a predetermined face of the workpiece as an XwYw face.

(Configuration of Motion Controller 300)

Figure 3:
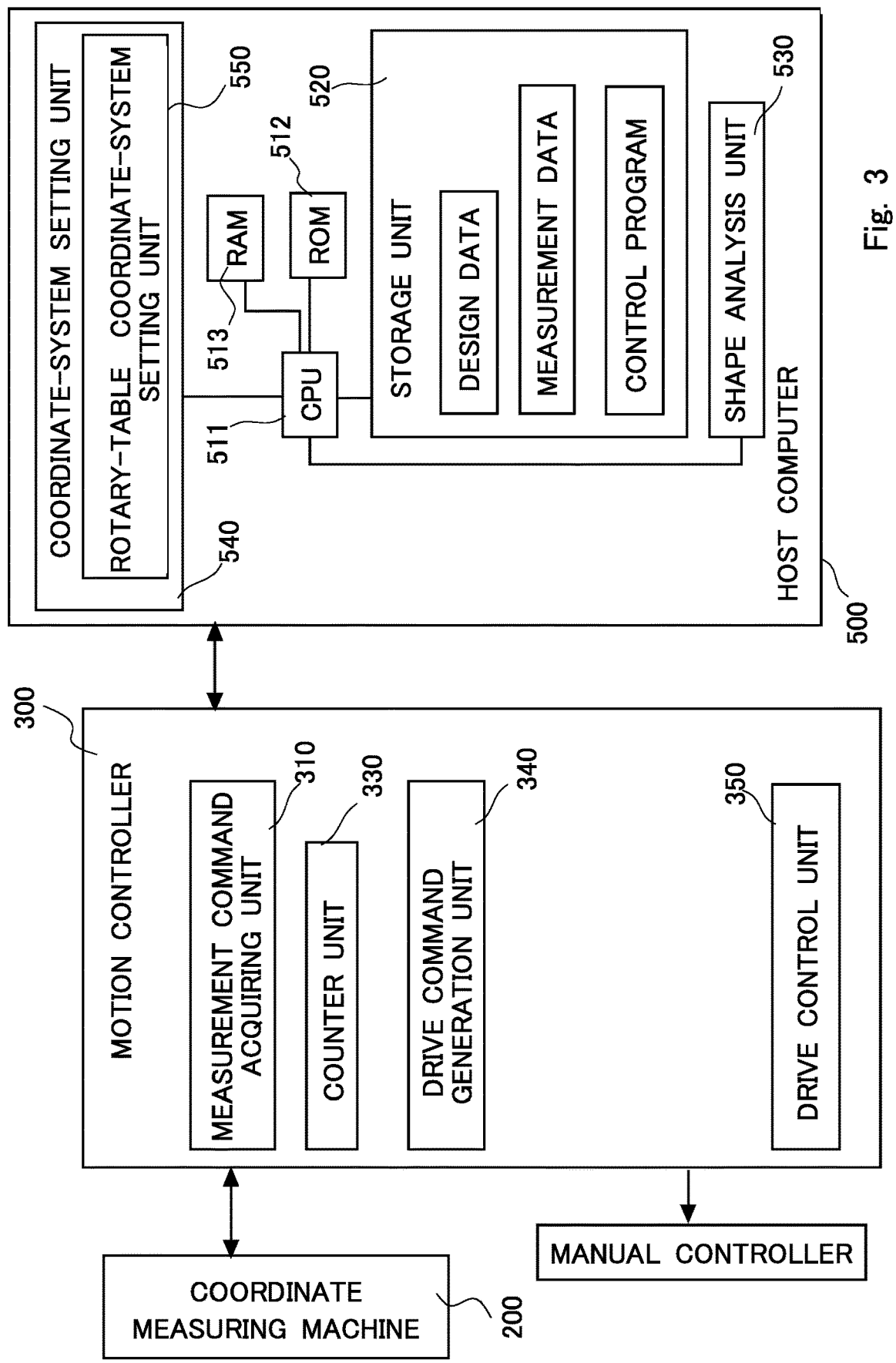
FIG. 3 is a functional block diagram showing a motion controller and a host computer.

FIG. 3 is a functional block diagram of a motion controller and a host computer.

The motion controller 300 includes a measurement command acquiring unit 310, a counter unit 330, a drive command generation unit 340, and a drive control unit 350.

The measurement command acquiring unit 310 acquires measurement command data from the host computer 500.

The counter unit 330 counts detection signals output from each encoder to measure the displacement amount of each slider, and counts detection signals output from the probe sensor to measure the displacement amount of the probe 230 (the stylus 231). From the measured displacement of each of the sliders and the probe 230, the coordinates position (probe position) of the contact point 232 is obtained. In addition, from the displacement of the stylus 231 measured by the counter unit 330 (a detection value (Px, Py, Pz) of the probe sensor), the deflection amount of the contact point 232 (the absolute value of a vector Ep) is obtained. Similarly, the counter unit 330 counts detection signals detected by the rotary encoder to obtain the rotating angle of the rotary table mechanism 250. The drive command generation unit 340 generates, based on the measurement command data from the host computer 500, a rotation drive command for the movement mechanism 220 and the rotary table mechanism 250. The velocity vector command for controlling the drive of the movement mechanism 220 is disclosed in, for example, JP 5274782 B, JP 6030339 B, and JP 6063161 B.
(Configuration of Host Computer 500)

The host computer 500 includes a central processing unit (CPU) 511, a memory, and the like and controls the coordinate measuring machine 200 through the motion controller 300.

The CPU 511 executes a control program, whereby an operation (a coordinate system setting) in the present exemplary embodiment is performed.

The host computer 500 is connected to, as necessary, output devices (a display and a printer) and input devices (a keyboard and a mouse).

The host computer 500 further includes a storage unit (recording media) 520, a shape analysis unit 530, a coordinate-system setting unit 540. The storage unit 520 stores design data (CAD data, NURBS data, or the like) regarding the shape of an object to be measured (workpiece) W, measurement data obtained by measurement, and a control program for controlling an entire measurement operation.

The shape analysis unit 530 calculates, based on measurement data output from the motion controller 300, surface shape data on an object to be measured to perform shape analysis for obtaining an error, distortion, and the like of the calculated surface shape data on the object to be measured. The shape analysis unit 530 further converts design data (CAD data, NURBS data, or the like) including information about a scanning path into a parametric cubic curve (PCC) to generate measurement command data.

The coordinate-system setting unit 540 sets each coordinate system described above.

The main feature of the present exemplary embodiment mainly is to set the rotary-table coordinate system, and a rotary-table coordinate-system setting unit 550, which is a functional unit of the coordinate-system setting unit 540, is described.

Figure 4:
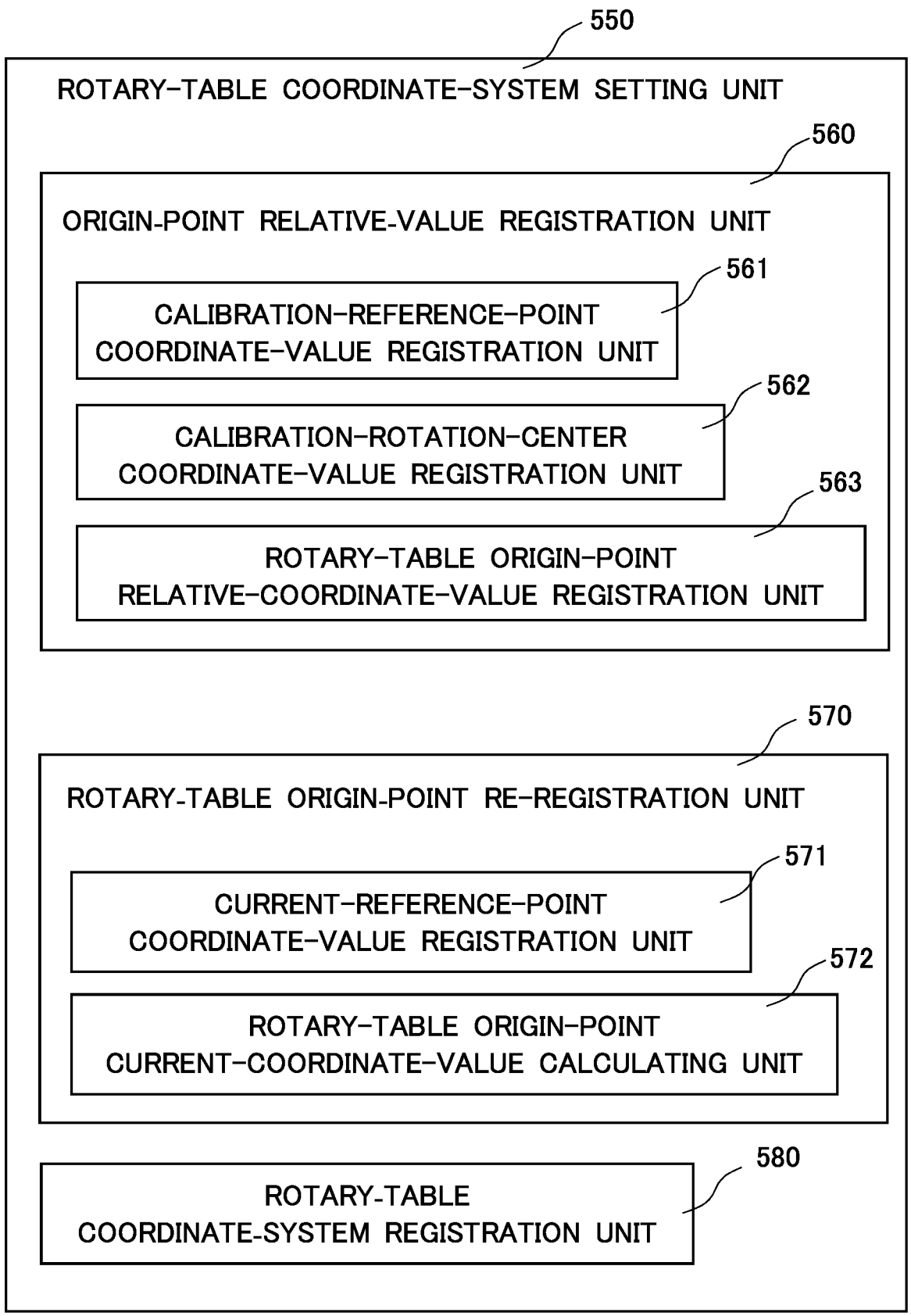
FIG. 4 is a functional block diagram showing a rotary-table coordinate-system setting unit.

FIG. 4 is a functional block diagram of the rotary-table coordinate-system setting unit 550.

The rotary-table coordinate-system setting unit 550 includes a origin-point relative-value registration unit 560, a rotary-table origin-point re-registration unit 570, and a rotary-table coordinate-system registration unit 580.

The origin-point relative-value registration unit 560 includes a calibration-reference-point coordinate-value registration unit 561, a calibration-rotation-center coordinate-value registration unit 562, and a rotary-table origin-point relative-coordinate-value registration unit 563.

The rotary-table origin-point re-registration unit 570 includes a current-reference-point coordinate-value registration unit 571 and a rotary-table origin-point current-coordinate-value calculating unit 572.

A concrete operation of each functional unit is described with reference to the flowchart.

Note that, the operation of each step and the function of each functional unit that are necessary for setting registration of a coordinate system are performed by the CPU 511 executing the control program stored in the storage unit 520.

One feature of the present exemplary embodiment is to provide a simple setting mode for the rotary-table coordinate system, but this needs to register, as a preparation, data necessary for the registration units 561, 562, and 563 of the origin-point relative-value registration unit 560 (an origin-point relative-value registration step). Thus, the origin-point relative-value registration step is described first.

Figure 5:
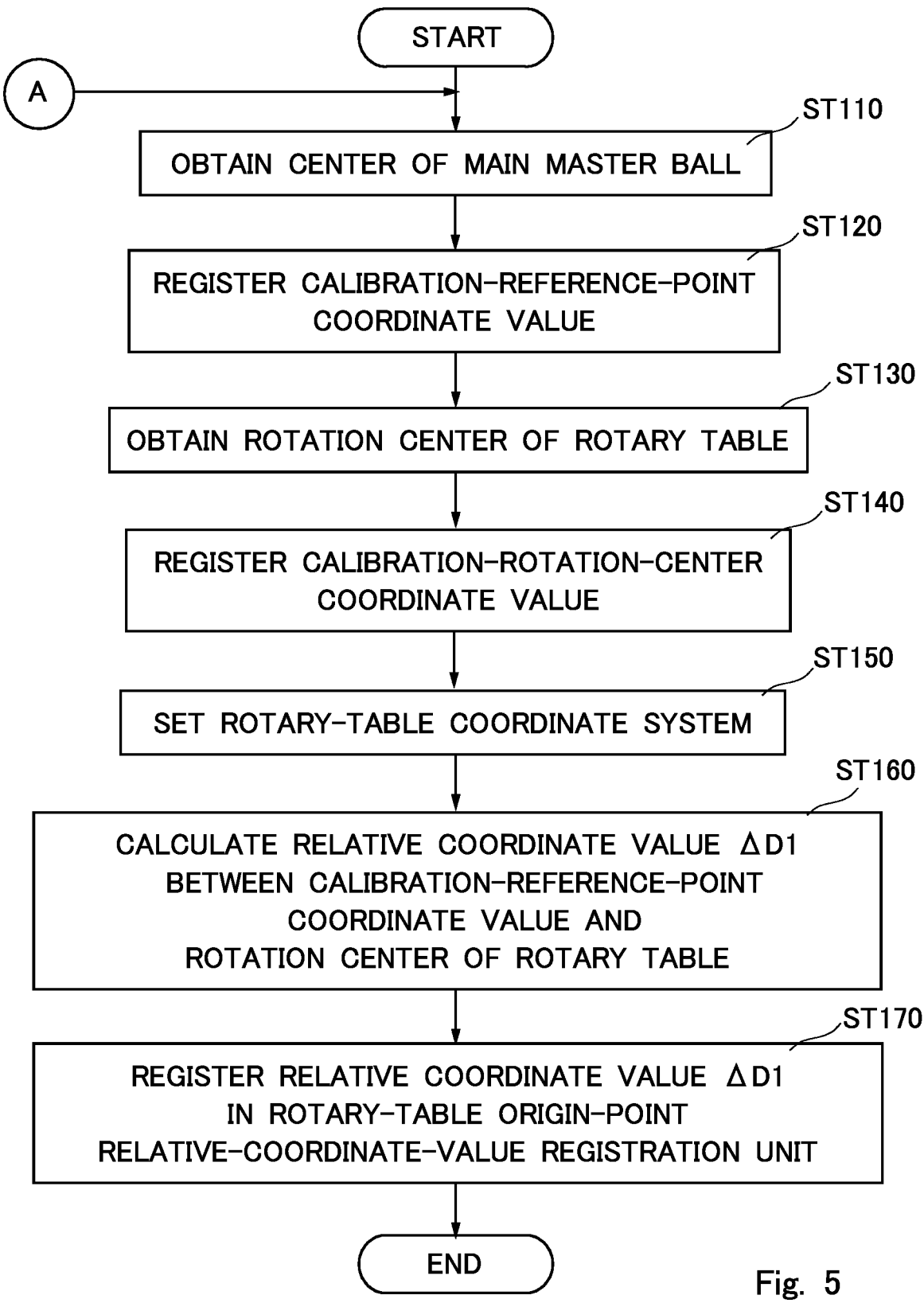
FIG. 5 is a flowchart showing a procedure of an origin-point relative-value registration step.

FIG. 5 is a flowchart showing a procedure of the origin-point relative-value registration step.

The rotary-table coordinate-system setting unit 550 performs an origin-point relative-value registration step ST100 when data is not registered in each registration unit of the origin-point relative-value registration unit 560 or in response to an instruction of an operator.

To perform the origin-point relative-value registration step ST100, the rotary-table coordinate-system setting unit 550 first moves the probe 230 with the movement mechanism 220 and measures a plurality of predetermined points on the surface of a main master ball 211 to obtain the center of the main master ball 211 (ST110).

The obtained center coordinate value of the main master ball 211 is also the origin point of the machine coordinate system. Here, the center coordinate value of the main master ball 211 is registered in the calibration-reference-point coordinate-value registration unit 561 as a calibration-reference-point coordinate value Pp (Ppx, Ppy, Ppz) of the rotary-table coordinate-system setting unit 550 (ST120).

Then, the rotation center of the rotary table 251 is obtained (ST130). A method for obtaining the rotation center of the rotary table 251 and calibrating the origin point of the rotary-table coordinate system is a known technique. For example, there is a known technique for calculating the rotation center or rotation axis of the rotary table 251 from the locus of a master ball or a gauge set on the rotary table 251 when the rotary table 251 is rotated. For example, JP 5332009 B and JP 6153816 B held by the present applicant also disclose such a technique. The obtained rotation-center coordinate value of the rotary table 251 is registered in the calibration-rotation-center coordinate-value registration unit 562 as a calibration-rotation-center coordinate value Rp (Rpx, Rpy, Rpz) (ST140).

With the above steps, the machine coordinate system is calibrated using the center coordinates of the main master ball 211, and the rotation center of the rotary table 251 in the calibrated machine coordinate system is obtained, whereby the calibrated rotary-table coordinate system is obtained (ST150).

Next, a rotary-table origin-point relative coordinate value ΔD1 is calculated (ST160).

The rotary-table origin-point relative coordinate value ΔD1 is a relative coordinate value of the calibration-rotation-center coordinate value Rp (Rpx, Rpy, Rpz) with respect to the calibration-reference-point coordinate value Pp (Ppx, Ppy, Ppz), using the calibration-reference-point coordinate value Pp (Ppx, Ppy, Ppz) as the base point.

Figure 6:
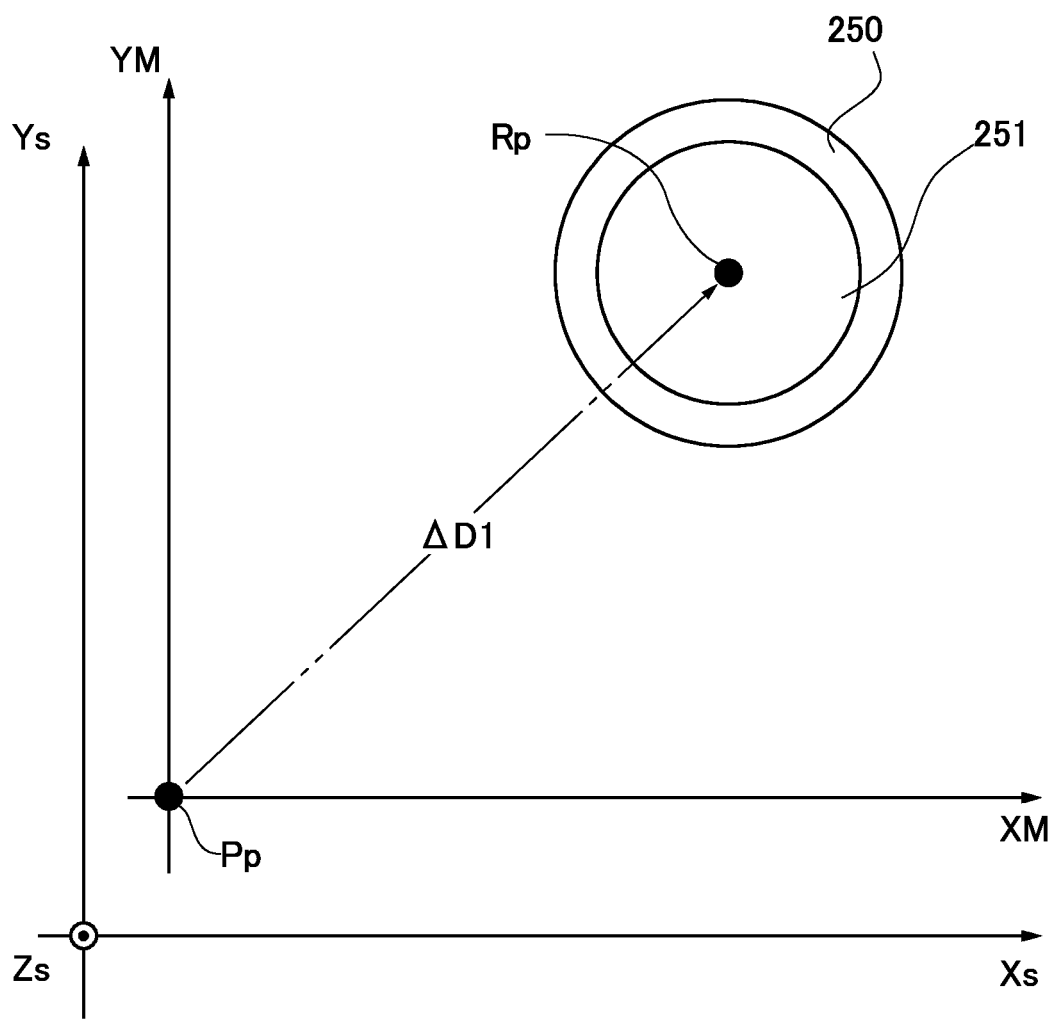
FIG. 6 is a diagram exemplifying relations among center coordinates of a main master ball (a calibration-reference-point coordinate value Pp), a rotation center of a rotary table (a calibration-rotation-center coordinate value Rp), and a rotary-table origin-point relative coordinate value $\Delta D1$.

FIG. 6 is a diagram showing relations among the center coordinates of the main master ball 211 (the calibration-reference-point coordinate value Pp), the rotation center of the rotary table 251 (the calibration-rotation-center coordinate value Rp), and the rotary-table origin-point relative coordinate value ΔD1.

$$\Delta D1=(Rpx, Rpy, Rpz)-(Ppx, Ppy, Ppz)=(Rpx-Ppx, Rpy-Ppy, Rpz-Ppz)$$

The rotary-table origin-point relative coordinate value ΔD1 calculated in this manner is registered in the rotary-table origin-point relative-coordinate-value registration unit 563 (ST170). With this step, the relative position between the center coordinates of the main master ball 211 and the rotation center of the rotary table 251 is registered. Accordingly, the origin-point relative-value registration step (ST100) as the preparation is completed.

The operator performs the origin-point relative-value registration step (ST100) when the coordinate measuring machine 200 is turned on or at an appropriate timing. It is preferable to determine the appropriate timing to perform the origin-point relative-value registration step (ST100) in advance in consideration of time intervals, a predetermined date and time, the number of measured workpieces, or the like.

Next, simple setting of the rotary-table coordinate system is described. When the coordinate measuring machine 200 is turned on or at an appropriate timing, it is necessary for the operator to calibrate the coordinate system. At this time, as a calibration work for the origin point of the machine coordinate system, the center of the main master ball 211 needs to be measured. Turning on and off or a continuous measurement work for a long time can deviate the origin point of the scale coordinate system, and which requires, as a calibration work for the machine coordinate system, to re-measure the center coordinates of the main master ball 211 to calibrate the origin point OM of the machine coordinate system. However, it takes considerable time and labor to perform a calibration work for the rotary-table coordinate system using a master ball or a gauge to obtain the center of the rotary table 251. For this reason, a simple setting mode for the rotary-table coordinate system is provided.

Figure 7:
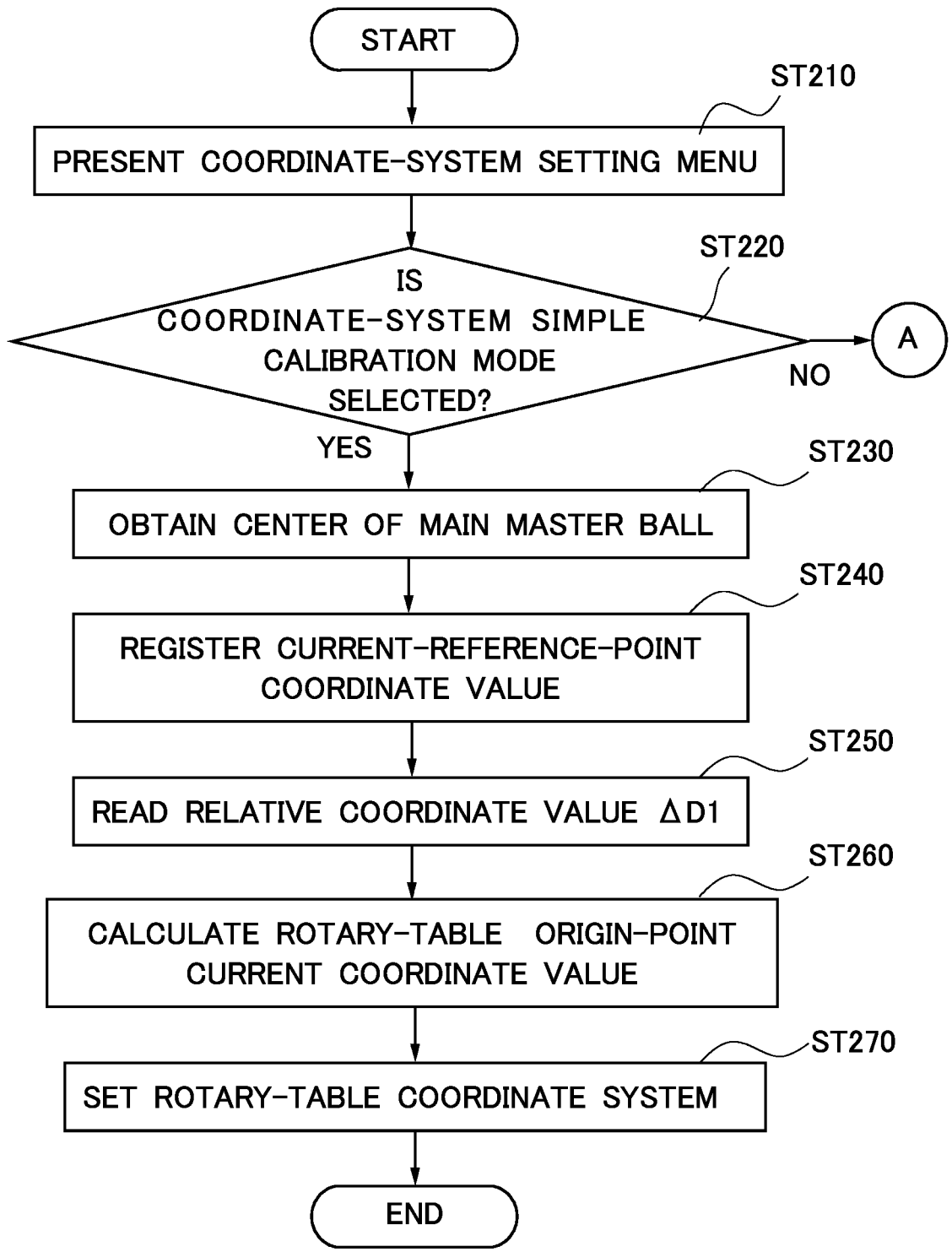
FIG. 7 is a flowchart showing a procedure of simple setting of a rotary-table coordinate system.

FIG. 7 is a flowchart showing a procedure of simple setting of the rotary-table coordinate system.

When the coordinate measuring machine 200 is turned on or when a menu is requested by the operator, the host computer 500 (CPU 511) presents a coordinate-system setting menu (ST210).

Figure 8:
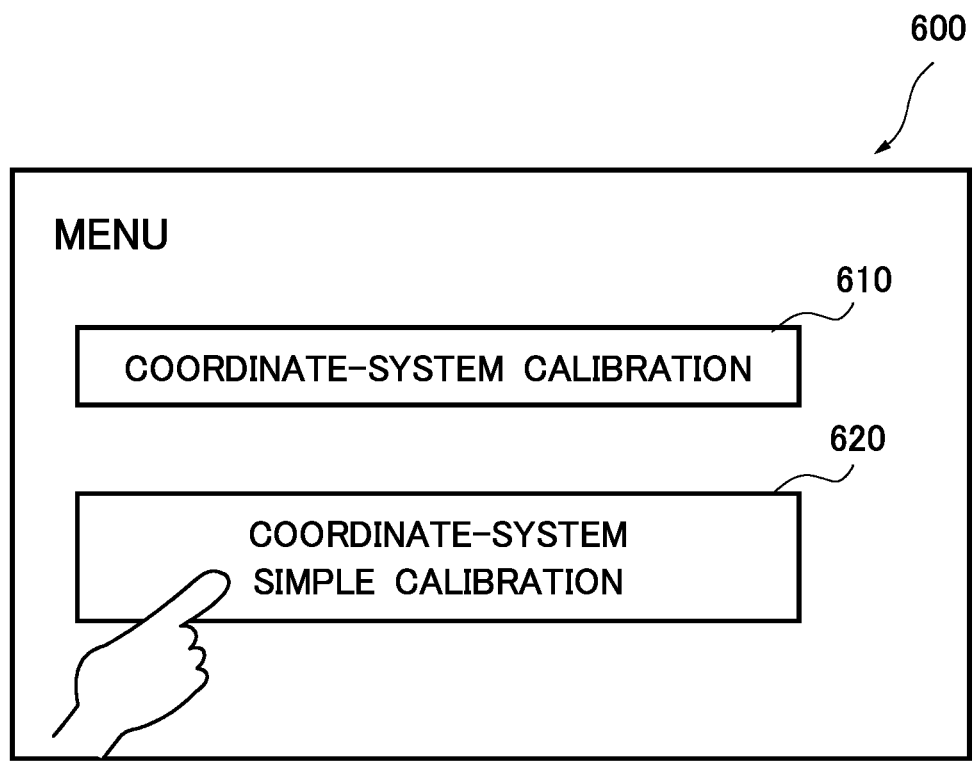
FIG. 8 is a diagram showing a coordinate-system setting menu.

FIG. 8 exemplifies a coordinate-system setting menu 600, and two modes of a coordinate-system calibration mode 610 and a coordinate-system simple calibration mode 620 are presented. Here, it is assumed that the coordinate-system simple calibration mode 620 is selected (ST220: YES).

In this case, the rotary-table coordinate-system setting unit 550 first measures the center coordinates of the main master ball 211 (ST230). That is, the probe 230 is moved with the movement mechanism 220, and a plurality of predetermined points on the surface of the main master ball 211 is measured to obtain the center of the main master ball 211. With this step, the machine coordinate system is calibrated using the center coordinates of the main master ball 211.

The center coordinate value of the main master ball 211 obtained at this time is registered in the current-reference-point coordinate-value registration unit 571 as a current-reference-point coordinate value Pc (ST240).

Figure 9:
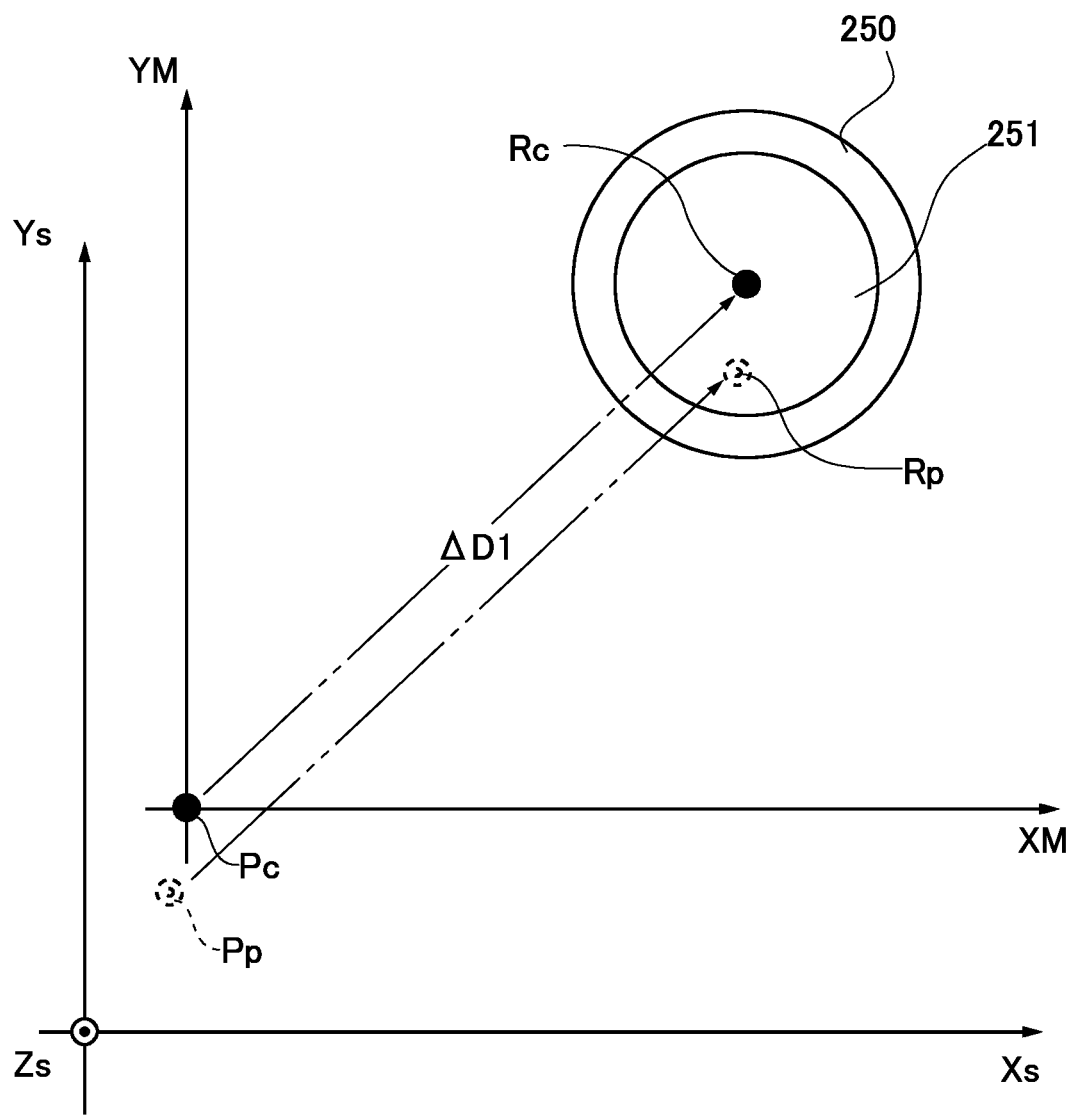
FIG. 9 is a diagram showing that there is a difference between a registered calibration-reference-point coordinate value Pp and a re-measured current-reference-point coordinate value Pc.
Figure 10:
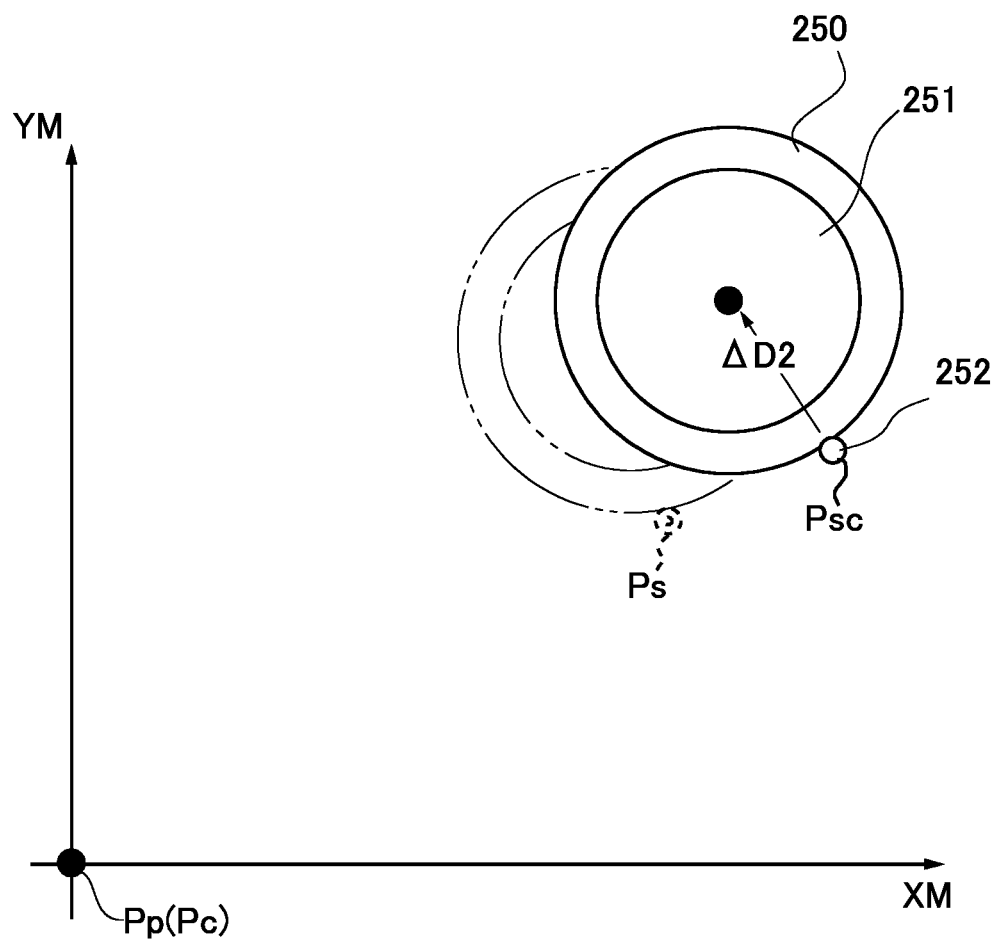
FIG. 10 is a diagram for explaining a second exemplary embodiment.

This current-reference-point coordinate value Pc is the center coordinates of the main master ball 211, but if the origin point of the scale coordinate system is changed, the current-reference-point coordinate value Pc is deviated by the change amount from the calibration-reference-point coordinate value Pp registered in the calibration-reference-point coordinate-value registration unit 561. FIG. 9 is a diagram exemplifying the difference between the registered calibration-reference-point coordinate value Pp and the re-measured current-reference-point coordinate value Pc.

Next, the rotary-table coordinate-system setting unit 550 reads the rotary-table origin-point relative coordinate value ΔD1 registered in the rotary-table origin-point relative-coordinate-value registration unit 563 (ST250).

In addition, the rotary-table coordinate-system setting unit 550 adds the rotary-table origin-point relative coordinate value ΔD1 to the current-reference-point coordinate value Pc to obtain the current-rotation-center coordinate value of the rotary table 251 (ST260). A current-rotation-center coordinate value Rc of the rotary table 251 obtained in this manner is set and registered as the origin point of the rotary-table coordinate system (ST270).

Note that, when the operator selects the normal coordinate-system calibration mode 610 in ST220 (ST220: NO), the rotary-table coordinate system is authentically calibrated by obtaining the rotation center of the rotary table 251 using a master ball or a gauge. In this case, in the origin-point relative-value registration step ST100 in FIG. 5, the calibration-reference-point coordinate value Pp, the calibration-rotation-center coordinate value Rp, and the rotary-table origin-point relative coordinate value ΔD1 are updated.

The present exemplary embodiment has the following effect. To calibrate the rotary-table coordinate system, it has been required to obtain the rotation center of the rotary table 251 by performing measurement, and which requires a work for measuring the locus of a master ball or a gauge while the rotary table 251 is rotated.

In this regard, in the present exemplary embodiment, the relative coordinate value ΔD1 of the rotation center of the rotary table 251 is registered, using the center coordinates of the main master ball 211 fixed above the surface plate 210 as the base point. Then, in the simple calibration mode, by adding the relative coordinate value ΔD1 to the center coordinates of the main master ball 211 (the current-reference-point coordinate value Pc) as the current reference point, the current-rotation-center coordinate value Rc of the rotary table 251 is obtained.

In this manner, the rotation center of the rotary table 251 is obtained by not actually performing measurement but by only adding the relative coordinate value ΔD1 to the current-reference-point coordinate value Pc, and it is possible to quickly easily calibrate the rotary-table coordinate system.

In addition, considering the reason that the rotary-table coordinate system needs to be calibrated is because that the origin point of the scale coordinate system is changed at each measurement, the change amount of the rotation-center coordinate value of the rotary table 251 is the same as the change amount of the center coordinate value of the main master ball 211, which is reasonable in experiments. Thus, the method according to present exemplary embodiment is a quick and easy calibration method and is capable of obtaining the calibrated rotary-table coordinate system with the equivalent accuracy as compared to the calibration when the rotation center of the rotary table 251 is actually measured.

(Second Exemplary Embodiment)

In the above first exemplary embodiment, the rotary-table coordinate system is calibrated using the relative coordinate value ΔD1 between the center coordinates Pp of the main master ball 211 installed above the surface plate 210 and the rotation center Rp of the rotary table 251.

In a second exemplary embodiment, a sub-master ball (a sub-reference point PS) 252 in addition to the main master ball 211 is provided at a position of the rotary table mechanism that is not rotated. Then, in the origin-point relative-value registration step, using the center coordinates of the sub-master ball 252 (the sub-reference point PS) as the base point, a relative coordinate value ΔD2 between the center coordinates of the sub-master ball 252 and the rotation center Rp of the rotary table 251 is registered. In a simple calibration mode, the center coordinates of the sub-master ball 252 (the sub-reference point PS) is actually measured, and the relative coordinate value ΔD2 is added to a current coordinate value PSc of the current sub-reference point PS, whereby a rotation-center coordinate value Rc of the rotary table 251 is obtained.

If the coordinate measuring machine 200 repeats measuring a workpiece, the position of the rotary table mechanism 250 can be changed. If the position of the rotary table mechanism 250 on the surface plate is changed, the rotary-table coordinate system is not properly calibrated only with the relative coordinate value ΔD1 in the first exemplary embodiment.

In this regard, the sub-master ball (the sub-reference point PS) 252 is provided to the rotary table mechanism 250 itself in the second exemplary embodiment. If the rotary table mechanism 250 is displaced, the relative position between the sub-master ball (the sub-reference point PS) 252 and the rotation center of the rotary table 251 is not changed. Thus, by actually measuring the sub-master ball (the sub-reference point PS) 252 in the calibrated machine coordinate system and adding the relative coordinate value ΔD2 thereto, it is possible to obtain the rotary-table coordinate system calibrated with high accuracy without actually measuring the rotation center of the rotary table 251.

Note that, the present invention is not limited to the above exemplary embodiments and can be appropriately modified without departing from the scope.

In the above exemplary embodiments, the main master ball or the sub-master ball may not be a master ball, and the main reference point PM or the sub-reference point may be, for example, a corner portion, such as a corner of a block gauge.

If the radius of a contact ball at the tip end of the probe is calibrated, a spherical ball having a known radius, that is, a master ball is needed. However, it is only required to have a point in space as the main reference point PM or the sub-reference point in the present exemplary embodiment, and the point does not necessarily need to be a ball.

In addition, the above exemplary embodiments each exemplify that the probe having a contact point as a contact ball and detects an object by bring the contact point into contact with the object. However, the probe is not limited to a contact type and includes a probe that detects an object while the contact point and the object are in a non-contact state. As such a non-contact type probe, there is, for example, an electrostatic capacitance probe or a probe using light.

After ST240, when the calibration-reference-point coordinate value PP registered in the calibration-reference-point coordinate-value registration unit 561 is compared with the current-reference-point coordinate value Pc newly measured and registered in the current-reference-point coordinate-value registration unit 571 and the difference therebetween exceeds a predetermined permissible range, the simple setting mode for the rotary-table coordinate system may be stopped, and the operator may be notified that the difference exceeds the permissible range.

Similarly, in the second exemplary embodiment, when the registered center coordinates of the sub-master ball 252 (the sub-reference point PS) is compared with the center coordinates of the sub-master ball 252 (the sub-reference point PSc) obtained in new measurement and the difference therebetween exceeds a permissible range, the simple setting mode for the rotary-table coordinate system may be stopped, and the operator may be notified that the difference exceeds the permissible range.

100 Shape measuring system,
200 Coordinate measuring machine,
210 Surface plate, 211 Main master ball,
220 Movement mechanism,
230 Probe,
231 Stylus,
232 Contact point,
233 Supporting portion,
250 Rotary table mechanism,
251 Rotary table,
252 Sub-master ball,
300 Motion controller,
310 Measurement command acquiring unit,
330 Counter unit,
340 Drive command generation unit,
350 Drive control unit,
500 Host computer,
520 Storage unit,
530 Shape analysis unit,
540 Coordinate-system setting unit,
550 Rotary-table coordinate-system setting unit,
560 Origin-point relative-value registration unit,
561 Calibration-reference-point coordinate-value registration unit,
562 Calibration-rotation-center coordinate-value registration unit,
563 Rotary-table origin-point relative-coordinate-value registration unit,
570 Rotary-table origin-point re-registration unit,
571 Current-reference-point coordinate-value registration unit,
572 Rotary-table origin-point current-coordinate-value calculating unit,
580 Rotary-table coordinate-system registration unit

The invention claimed is:

1. A control method of a shape measuring apparatus comprising:
a base portion;
a movement mechanism having three translation axes orthogonal to each other;
a probe supported by the movement mechanism and having a detection point at a tip end;
a rotary table mechanism configured to rotationally drive, around a rotation axis, a rotary table on which an object to be measured is placed; and
a main reference point PM fixedly installed to the base portion,
the shape measuring apparatus being configured to measure a shape of the object to be measured with the probe,
the control method comprising a setting registration method of a rotary-table coordinate system having a center point of the rotary table as an origin point OT, wherein
the setting registration method comprises:
an origin-point relative-value registration step; and
a rotary-table origin-point re-registration step,
the origin-point relative-value registration step comprises the steps of:
measuring the main reference point PM with the probe to acquire a coordinate value of the main reference point PM and registering the acquire coordinate value of the main reference point PM as a calibration-reference-point coordinate value Pp (Ppx, Ppy, Ppz);
obtaining a rotation center point of the rotary table and registering the obtained rotation center point as a calibration-rotation-center coordinate value Rp (Rpx, Rpy, Rpz); and
calculating a relative coordinate value of the calibration-rotation-center coordinate value Rp (Rpx, Rpy, Rpz) with respect to the calibration-reference-point coordinate value Pp (Ppx, Ppy, Ppz) and registering the calculated relative coordinate value as a rotary-table origin-point relative coordinate value ΔD1,
the rotary-table origin-point re-registration step is performed to register re-setting of the rotary-table coordinate system, and
the rotary-table origin-point re-registration step comprising the steps of:
measuring the main reference point PM with the probe to acquire a coordinate value of the main reference point PM and registering the acquired coordinate value as a current-reference-point coordinate value Pc (Pcx, Pcy, Pcz); and
adding the rotary-table origin-point relative coordinate value ΔD1 to the current-reference-point coordinate value Pc (Pcx, Pcy, Pcz) to calculate a rotary-table origin-point current coordinate value Rc (Rcx, Rcy, Rcz).

2. A control method of a shape measuring apparatus comprising:
a base portion;
a movement mechanism having three translation axes orthogonal to each other;
a probe supported by the movement mechanism and having a detection point at a tip end;
a rotary table mechanism configured to rotationally drive, around a rotation axis, a rotary table on which an object to be measured is placed;
a main reference point PP fixedly installed to the base portion; and
a sub-reference point PS fixedly installed to a point of the rotary table mechanism, the point being non-rotatable,
the shape measuring apparatus being configured to measure a shape of the object to be measured with the probe,
the control method comprising a setting registration method of a rotary-table coordinate system having a center point of the rotary table as an origin point OT, wherein
the setting registration method comprises:
an origin-point relative-value registration step; and
a rotary-table origin-point re-registration step,
the origin-point relative-value registration step comprises the steps of:
measuring the sub-reference point PS with the probe to acquire a coordinate value of the sub-reference point PS and registering the acquired coordinate value of the sub-reference point PS as a calibration-sub-reference-point coordinate value PS (Psx, Psy, Psz);
obtaining a rotation center point of the rotary table and registering the obtained rotation center point as a calibration-rotation-center coordinate value Rp (Rpx, Rpy, Rpz); and
calculating a relative coordinate value between the calibration-sub-reference-point coordinate value PS (Psx, Psy, Psz) and the calibration-rotation-center coordinate value Rp (Rpx, Rpy, Rpz) and registering the calculated relative coordinate value as a rotary-table origin-point relative coordinate value ΔD2,
the rotary-table origin-point re-registration step is performed to register re-setting of the rotary-table coordinate system, and
the rotary-table origin-point re-registration step comprises the steps of:

measuring the main reference point PP with the probe to acquire a coordinate value of the main reference point PP and registering the acquired coordinate value as a current-reference-point coordinate value PPc (PPcx, PPcy, PPcz);

measuring the sub-reference point PS with the probe to acquire a coordinate value of the sub-reference point PS and registering the acquired coordinate value as a current-sub-reference-point coordinate value PSc (PScx, PScy, PScz); and adding the rotary-table origin-point relative coordinate value ΔD2 to the current-sub-reference-point coordinate value PSc (PScx, PScy, PScz) to calculate a rotary-table origin-point current coordinate value Rc (Rcx, Rcy, Rcz).

3. The control method of the shape measuring apparatus according to claim 2, the control method further comprising comparing the calibration-sub-reference-point coordinate value PS (Psx, Psy, Psz) with the current-sub-reference-point coordinate value PSc (PScx, PScy, PScz) to obtain a difference between the calibration-sub-reference-point coordinate value PS (Psx, Psy, Psz) and the current-sub-reference-point coordinate value PSc (PScx, PScy, PScz) and notifying an operator or performing the origin-point relative-value registration step when the difference is equal to or greater than a preset permissible value.

4. A recording medium recording a control program of a shape measuring apparatus causing a computer to execute the control method of the shape measuring apparatus according to claim 1.

5. A recording medium recording a control program of a shape measuring apparatus causing a computer to execute the control method of the shape measuring apparatus according to claim 2.

* * * * *